(12) United States Patent
Cortese (10) Patent No.: US 9,162,693 B2
(45) Date of Patent: Oct. 20, 2015

(54) HAND TRUCK MOUNTING STRUCTURE

(71) Applicant: Richard Cortese, Pueblo, CO (US)

(72) Inventor: Richard Cortese, Pueblo, CO (US)

( * ) Notice: Subject to any disclaimer, the term of this patent is extended or adjusted under 35 U.S.C. 154(b) by 0 days.

(21) Appl. No.: 14/474,108

(22) Filed: Aug. 30, 2014

(65) Prior Publication Data

US 2015/0063961 A1    Mar. 5, 2015

Related U.S. Application Data

(60) Provisional application No. 61/872,496, filed on Aug. 30, 2013.

(51) Int. Cl.
*B62B 1/14* (2006.01)
*B62B 1/12* (2006.01)
*B60P 7/08* (2006.01)
*A63B 21/16* (2006.01)

(52) U.S. Cl.
CPC . *B62B 1/14* (2013.01); *B62B 1/125* (2013.01); *A63B 21/1627* (2013.01); *B60P 7/0823* (2013.01)

(58) Field of Classification Search
CPC ...... A63B 21/1627; B62B 1/04; B62B 1/125; B62B 2203/44; B62B 1/06; B62B 1/14
USPC .......... 280/47.18; 414/444, 448, 449; 482/40, 482/904
See application file for complete search history.

(56) References Cited

U.S. PATENT DOCUMENTS

| | | | | |
|---|---|---|---|---|
| 2,277,302 A * | 3/1942 | Chenette | ................. | 280/659 |
| 2,623,760 A * | 12/1952 | Fornelius | ................. | 410/51 |
| 2,838,190 A * | 6/1958 | Stevens | ................. | 414/448 |
| 3,457,786 A * | 7/1969 | Trent | ................. | 482/40 |
| 3,712,496 A * | 1/1973 | Miller | ................. | 414/490 |
| 4,860,606 A * | 8/1989 | Rousseau | ................. | 74/157 |
| 5,501,497 A * | 3/1996 | Holloway | ................. | 294/86.4 |
| 5,941,543 A * | 8/1999 | Kazmark, Jr. | ................. | 280/47.29 |
| 5,984,612 A * | 11/1999 | Tatro | ................. | 414/448 |
| 6,092,817 A * | 7/2000 | Kilmer | ................. | 280/47.26 |
| 6,244,603 B1 * | 6/2001 | Rizzardi | ................. | 280/47.331 |
| 6,398,673 B1 * | 6/2002 | Maruca | ................. | 473/481 |
| 7,108,636 B1 * | 9/2006 | Garcia | ................. | 482/40 |
| 7,322,909 B1 * | 1/2008 | Loccarini et al. | ................. | 482/129 |
| 8,840,121 B2 * | 9/2014 | Reeves | ................. | 280/47.29 |
| 2002/0187864 A1 * | 12/2002 | Griswold | ................. | 473/483 |
| 2010/0327562 A1 * | 12/2010 | Kasuya et al. | ................. | 280/651 |
| 2012/0129658 A1 * | 5/2012 | Hunt et al. | ................. | 482/38 |
| 2012/0153587 A1 * | 6/2012 | Ryan et al. | ................. | 280/47.27 |
| 2013/0217544 A1 * | 8/2013 | Anaya | ................. | 482/40 |
| 2014/0323275 A1 * | 10/2014 | Moses, II | ................. | 482/40 |

FOREIGN PATENT DOCUMENTS

DE    3309620 A1 *  9/1984  ............ A63B 21/04

* cited by examiner

*Primary Examiner* — James Keenan
(74) *Attorney, Agent, or Firm* — Leyendecker & Lemire, LLC (57) ABSTRACT

A mounting structure for a hand truck is described. Embodiments of the present invention include a mounting structure adapted to be secured to a hand truck. Generally, the mounting structure can be implemented to secure a strapping device to the hand truck. The mounting structure can generally include a body, a first member, a second member, and a spring. Typically, the first member can be slidably coupled to the body and the second member can be fixedly coupled to the body. The first member and the second member can include concave faces to interface with a frame of the hand truck. The mounting structure can couple to the hand truck in a variety of locations to ensure that the strapping device is optimally positioned to secure a particular load.

20 Claims, 7 Drawing Sheets

HAND TRUCK MOUNTING STRUCTURE

CROSS-REFERENCE TO RELATED APPLICATION

This application claims the benefit of U.S. Provisional Application No. 61/872,496, filed Aug. 30, 2013.

BACKGROUND

Hand trucks are commonly used to move items that are too heavy or bulky to be moved manually. Using such a device reduces the amount of physical effort required to lift and move heavy and/or bulky loads.

Strapping devices are commonly used for transporting goods. A strapping device typically has a fixed strap, a variable strap, and a ratchet. The ratchet is implemented to reduce a length of the variable strap thereby tightening straps of the strapping device around a load. The strapping device is generally used to secure goods being transported.

Currently, there are many different designs of strapping devices that can be used to secure a load to a hand truck that are independent of the hand truck. Implementing these strapping devices to attach a load to a hand truck is cumbersome and difficult, especially when done by one person. Further, with many different types of hand trucks, a person may need multiple types of strapping devices to use with each different hand truck. Alternatively, there are a few specialized hand trucks manufactured with a strapping device permanently built into the hand truck. These specialized hand trucks are limited in that the strapping device is permanently positioned on the hand truck and cannot be moved.

There is a need for a mounting structure adapted to attach a plurality of different types of strapping devices to a variety of hand trucks.

DETAILED DESCRIPTION

Embodiments of the present invention include a mounting structure adapted to secure to a hand truck. The mounting structure can generally be implemented to removably couple a strapping device to different locations on the hand truck. For instance, the mounting structure, with strapping device attached, can be secured to an upper portion of the hand truck for a tall load. In another instance, the mounting structure can be attached to a lower portion of a hand truck for shorter loads.

In one embodiment, the mounting structure can include a body, a first engagement member, a second engagement member, and a spring. Typically, the body can be a tube having a substantially rectangular cross-section adapted to receive the engagement members. The engagement members can be implemented to interface with a frame of a hand truck. To make the mounting structure adjustable in length, one of the engagement members can be slidably coupled to the body.

In one embodiment, a first engagement member can be slidably coupled inside the body on one end and a second engagement member can be fixedly coupled inside the body on the other end. The engagement members can each be adapted to partially insert into ends of the body. In a typical implementation, the spring can be inserted inside the body between the engagement members. The spring can generally be implemented to provide a resistive force to the first engagement member.

Generally, the engagement members can each be adapted to interface with a frame of a hand truck. For instance, ends of the engagement members can have a concave face adapted to interface with a tubular structure. In another instance, the engagement members can have a forked face adapted to interface with a rectangular tube. In one embodiment, the engagement members can have different shaped faces for hand trucks including both tubular frame sections and squared frame sections. It is to be appreciated that the engagement members can have one of a plurality of different shaped faces adapted to interface with most frame structures of current hand trucks on the market.

To attach a strapping device the mounting structure, the mounting structure can include an aperture adapted to receive a fastener. The fastener can be implemented to couple the strapping device to the mounting structure. For instance, the aperture can be a hole adapted to receive a screw that can couple a strapping device to the mounting structure. In another instance, the aperture can be a slot adapted to receive a portion of a strapping device. It is to be appreciated that the mounting structure can include, but is not limited to, a variety of attachment structures adapted to couple to a strapping device. In one embodiment, the body can include a plurality of apertures spaced along a length of the body each adapted to receive a fastener. Generally, a user can then select one of the aperture locations to secure the strapping device to the body.

In some embodiments, the mounting structure can further include a stop member. Generally, the stop member can be implemented inside the body between the engagement members. For instance, the stop member can be fixedly coupled inside the body between the engagement members. The stop member can generally be placed such that the spring interfaces with the first engagement member and the stop member.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "strapping device," as used in the specification and appended claims, refers to tie-downs, ratchet straps, tie-down ratchets, and other similar devices.

A First Embodiment of a Mounting Structure

Referring to FIGS. 1A-1D, detailed diagrams of an embodiment 100 showing a mounting structure are illustrated. Typically, the mounting structure 100 can be implemented to secure a strapping device to a hand truck, as shown in FIGS. 2A-2B. For instance, the mounting structure 100 can be used to secure a ratchet tie-down to a hand truck.

The mounting structure 100 can generally include a body 102, a first engagement member 104, a second engagement member 106, a spring 108, and an aperture 110.

Figure 1A:
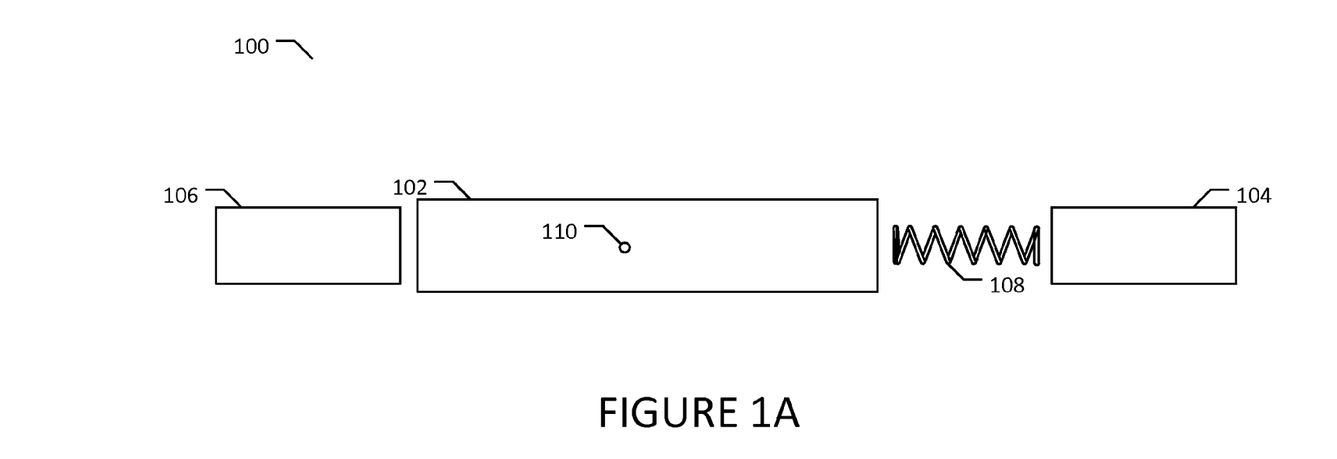
FIG. 1A is an exploded side view of a mounting structure according to one embodiment of the present invention.
Figure 1B:
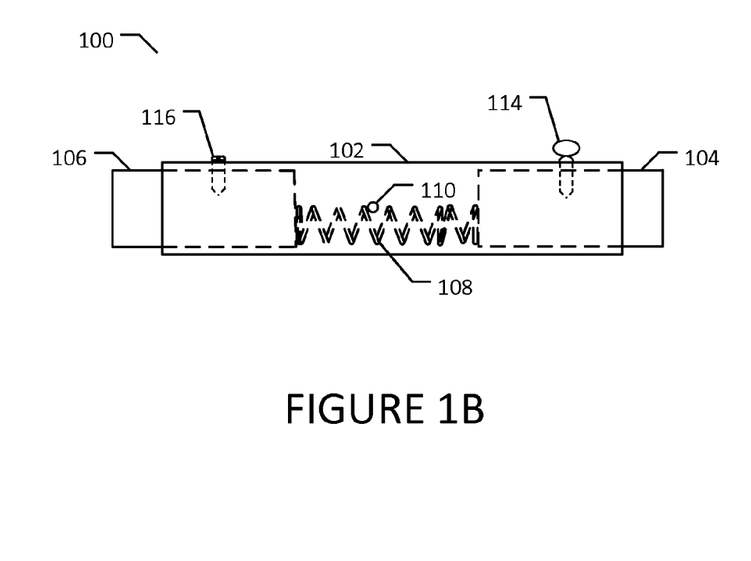
FIG. 1B is a side view of a mounting structure according to one embodiment of the present invention.
Figure 2A:
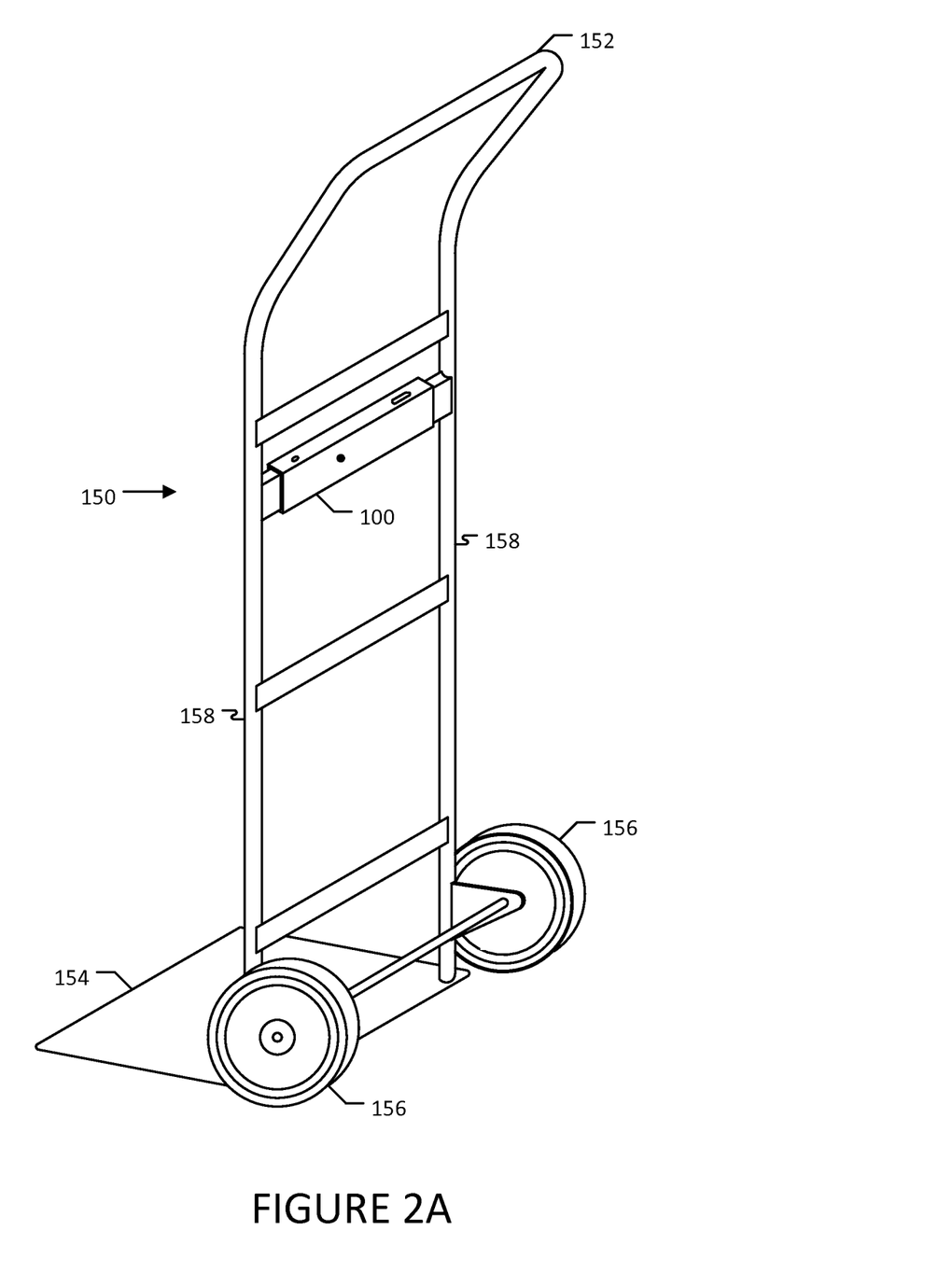
FIG. 2A is a back view of a mounting structure attached to a hand truck according to one embodiment of the present invention.
Figure 2B:
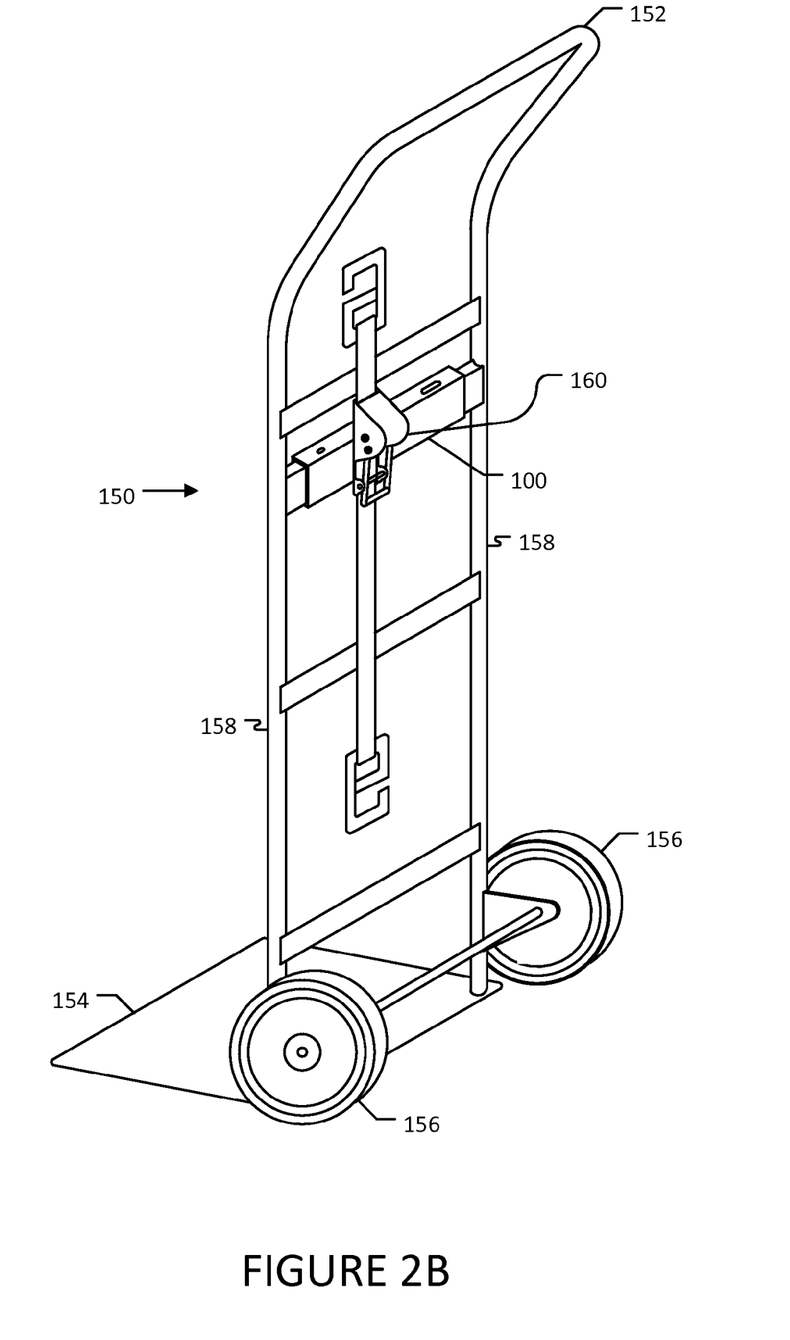
FIG. 2B is a back view of a mounting structure with a strapping device in a horizontal orientation attached to a hand truck according to one embodiment of the present invention.

As shown in FIGS. 1A-1B, the body 102 can be a tube having a substantially rectangular cross-section. In one embodiment, the body 102 can be a tube having a substantially square cross-section. The body 102 can generally be manufactured from a rigid material including, but not limited to, steel, plastic, aluminum, and similar materials. Typically, the rigid body 102 can have a length between 10 inches to 24 inches. In some embodiments, the rigid body 102 can be cut to size to fit a particular hand truck. It is to be appreciated that the rigid body 102 can have a variety of sizes without exceeding a scope of the present disclosure. For example, the rigid body 102 can be a 2 inch by 1 inch rectangular steel tube having a 14 inch length.

In one embodiment, the first engagement member 104 and the second engagement member 106 can each be a rectangular block having a cross-section smaller than the tube 102. Generally, the engagement members 104, 106 can be manufactured from a rigid material including, but not limited to, hard plastics, aluminum, steel, and similar materials. In one embodiment, the engagement members 104, 106 can be manufactured from a semi-rigid material.

The first engagement member 104 can be located proximate a right end of the rigid body, as shown in FIG. 1B. In one embodiment, the first engagement member 104 can be slidably coupled to the rigid body 102 approximate the right end of the body 102. The first engagement member 104 can generally be partially inserted into the body 102, as shown in FIG. 1B.

Figure 1C:
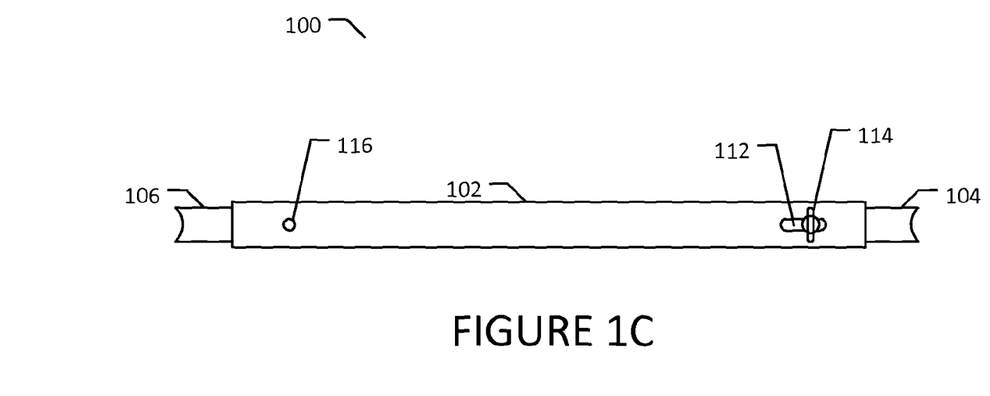
FIG. 1C is a top view of a mounting structure according to one embodiment of the present invention.

Referring to FIG. 1C, a top view of the mounting structure 100 is illustrated. As shown, the rigid body 102 can include a slot 112 on a top side of the rigid body 102. A first fastener 114 can couple the first engagement member 104 to the rigid body 102. Generally, the first fastener 114 can be threaded through the slot 112 to couple the first engagement member 104 to the body 102. In one embodiment, the first fastener 114 can be a thumb screw. It is to be appreciated that other types of fasteners can be implemented to secure the first engagement member 104 to the rigid body 102.

Generally, the first engagement member 104 can slidably engage with the right end of the rigid body 102. For instance, a portion of the first engagement member 104 can slide in and out of the rigid body 104. The first engagement member 104 can generally move a distance equal to a length of the slot 112. In a typical implementation, the first engagement member 104 can move when the first fastener 114 is loose. When the first fastener 114 is tightened, the first engagement member 104 can be secured to the rigid body 102.

The second engagement member 106 can generally be located approximate a left end of the rigid body 102. Generally, the second engagement member 106 can be fixedly attached to the rigid body 102 and partially inserted into the body 102. A second fastener 116 can be implemented to secure the second engagement member 106 to the rigid body 102. In one embodiment, the second fastener 116 can be a screw. It is to be appreciated that other fasteners can be implemented to fixedly secure the second engagement member 106 to the rigid body 102.

As shown in FIG. 1B, the spring 108 can be located between the first engagement member 104 and the second engagement member 106. In one embodiment, the spring 108 can be a compression spring. Generally, the spring 108 can be loaded with compression when placed between the first engagement member 104 and the second engagement member 106. The spring 108 can be implemented to provide a resistive force to the first engagement member 104 as the first engagement member 104 moves along the slot 112. For instance, as the first engagement member 104 moves toward the second engagement member 106, the spring 108 can have more compression. Some compression can be released as the first engagement member 104 moves away from the second engagement member 106. Generally, the spring 108 can provide a restorative force such that when the first engagement member 104 is not secured to the body 102, the mounting structure 100 can remain braced to a frame of a hand truck.

Figure 3A:
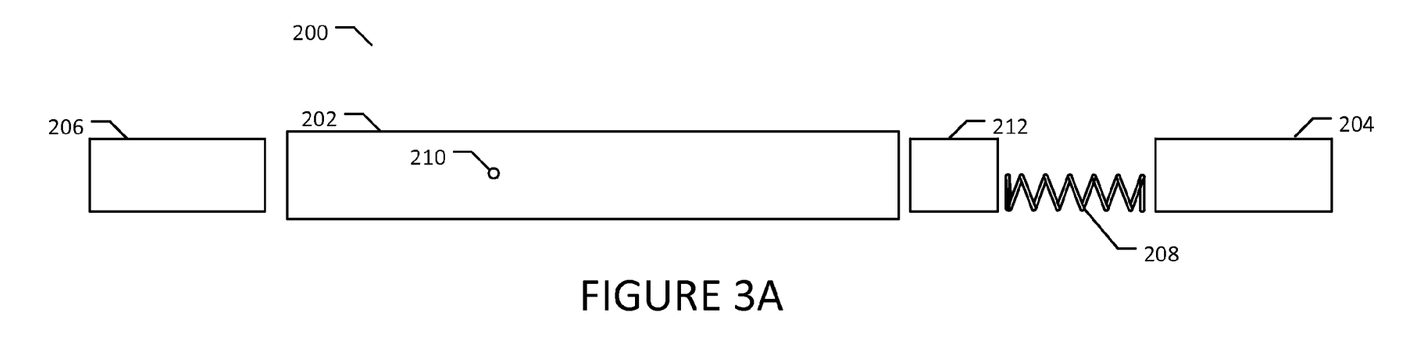
FIG. 3A is an exploded side view of another mounting structure according to one embodiment of the present invention.
Figure 3B:
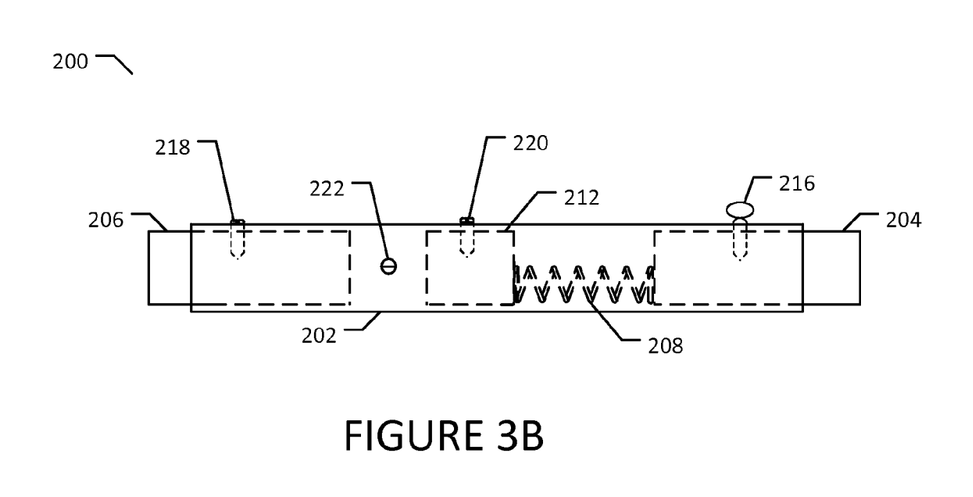
FIG. 3B is a side view of another mounting structure according to one embodiment of the present invention.
Figure 3C:
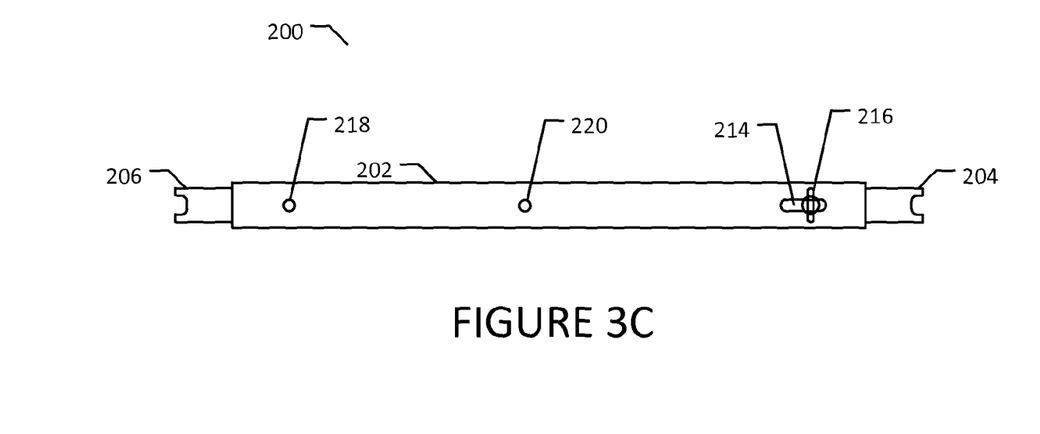
FIG. 3C is a top view of another mounting structure according to one embodiment of the present invention.

Referring to FIGS. 1C and 3C, different shapes for ends of the engagement members 104, 106 and engagement members 204, 206 are illustrated. To interface with a frame of a hand truck, ends of the engagement members can be adapted to interface with the frame. For instance, the engagement members 104, 106 can each have a concave face for tubular frames, as shown generally in FIG. 1C. In instances where the frame has squared/rectangular tubes, ends of the engagement members 204, 206 can be forked, as shown in FIG. 3C.

The rigid body 102 can include the aperture 110 to receive a fastener 118. Generally, the fastener 118 can be implemented to removably couple a strapping device to the rigid body 102. The strapping device fastener 118 can include, but is not limited to, a screw, a nut, a magnet, and a patch of hook and loop material. It is to be appreciated that the strapping device fastener 118 can include a variety of attachment structures adapted to couple two objects together. In one embodiment, the strapping device can be rotatably coupled to the body 102.

Figure 1D:
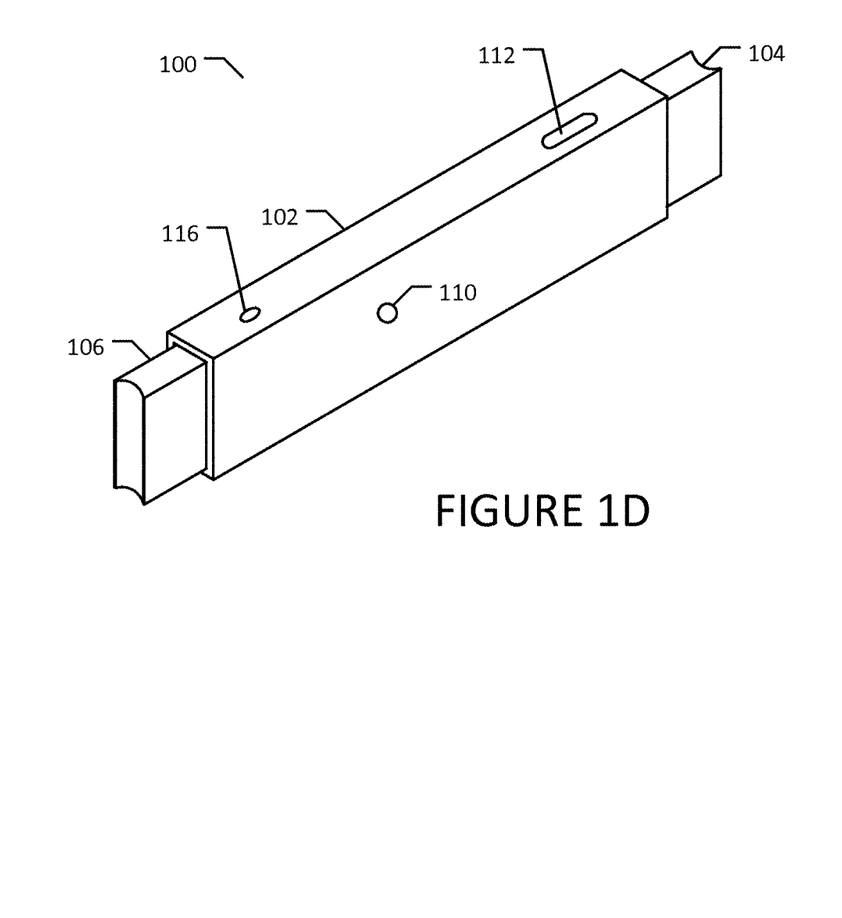
FIG. 1D is a perspective view of a mounting structure according to one embodiment of the present invention.

Referring to FIG. 1D, a perspective view of the mounting structure 100 is illustrated. As shown, the body 102 can have a substantially rectangular cross-section and the second engagement member 106 is shown partially inserted into the body 102.

Figure 2C:
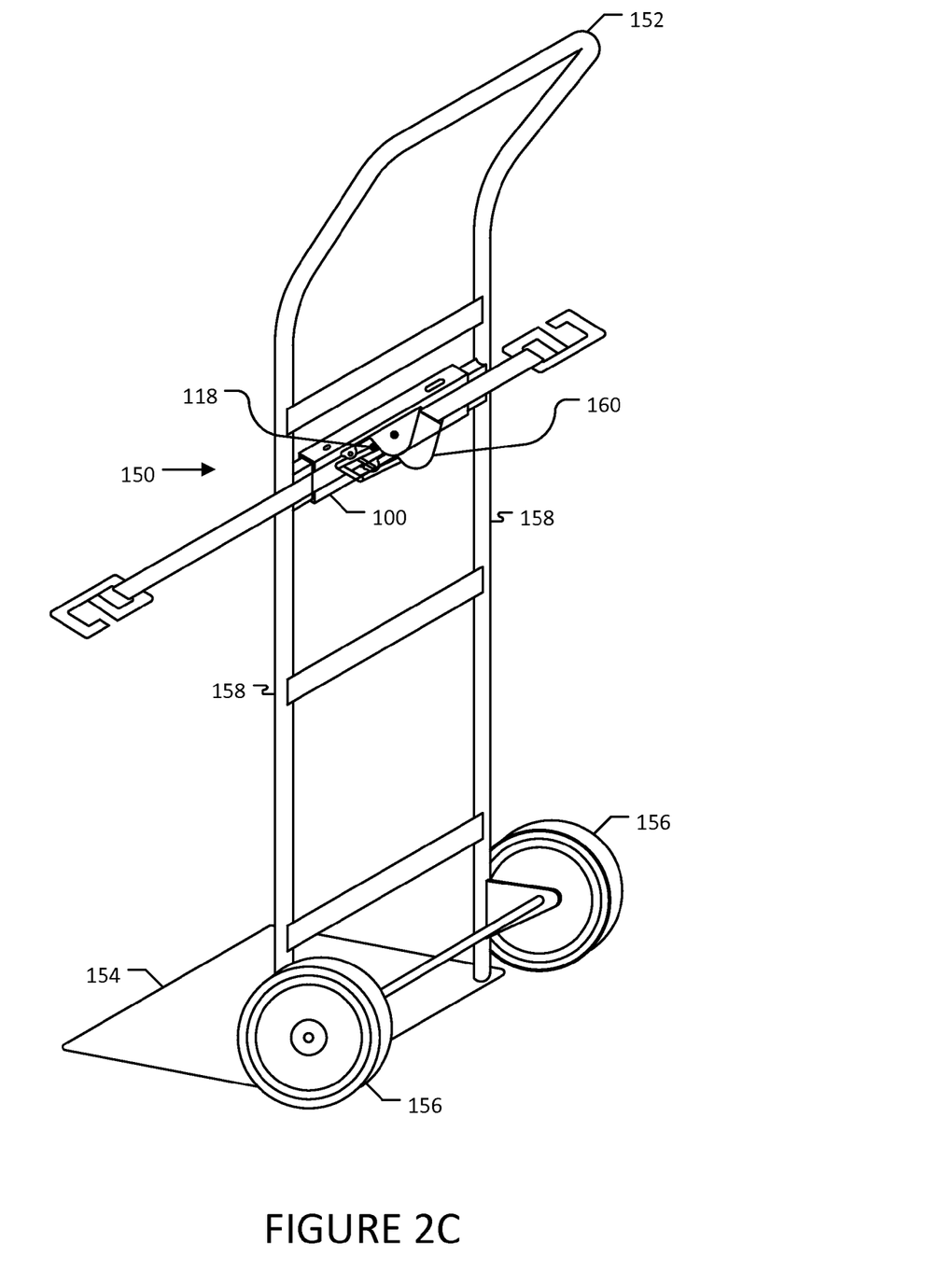
FIG. 2C is a back view of a mounting structure with a strapping device in a vertical orientation attached to a hand truck according to one embodiment of the present invention.

Referring to FIGS. 2A-2C, the mounting structure 100 is shown coupled to a hand truck 150. As shown in FIG. 2A, the hand truck 150 can include a frame 152, a plate 154, and a pair of wheels 156. The frame 152 can include a plurality of tubes 158. As shown in FIG. 2A, the mounting structure 100 can generally be coupled between two tubes 158 of the frame 152.

As shown in FIGS. 2B-2C, a strapping device 160 can be implemented with the hand truck 150 via the mounting structure 100. The mounting structure 100 can couple the strapping device 160 in different locations on the hand truck 150. Generally, the mounting structure 100 can be secured to the frame 152 of the hand truck 150 anywhere two of the tubes 158 run parallel.

In one embodiment, the strapping device 160 can be rotatably coupled to the mounting structure 100. For instance, the strapping device 160 can rotate from a horizontal orientation to a vertical orientation, as shown in FIGS. 2B-2C.

In a typical implementation, the strapping device 160 can be fastened over a top of a load and under the plate 154 of the hand truck 150. The strapping device 160, when in the vertical orientation, can be useful in securing loads that rise above the hand truck 150 including, but not limited to, plywood, posts, landscape lumbers, two-by-fours, steel sheets, steel pipes, plastic sheets, and/or plastic pipe. When a load is wider than tall, the strapping device 160 can generally be used in the horizontal orientation.

A Second Embodiment of a Mounting Structure

Referring to FIGS. 3A-3C, detailed diagrams of a second embodiment 200 of a mounting structure are illustrated. The second embodiment mounting structure 200 can be implemented to secure a strapping device to a hand truck. Generally, the second embodiment mounting structure 200 can be implemented similar to the first embodiment mounting structure 100.

As shown in FIG. 3A, the mounting structure 200 can generally include a body 202, a first engagement member 204, a second engagement member 206, a spring 208, an aperture 210, and a stop member 212.

Generally, the components of the second embodiment mounting structure 200 can be implemented similar to the first embodiment mounting structure 100. For instance, the body 202, the engagement members 204, 206, the spring 208, and the aperture 210 can be similar to the first embodiment components. For example, the body 202 can be a tube having a substantially rectangular cross-section. It is to be appreciated that the body 202 can have a variety of other shapes. Similar to the first embodiment body 102, the second embodiment body 202 can generally be manufactured from a rigid material including, but not limited to, steel, plastic, aluminum, and similar materials.

The first engagement member 204 can be located proximate a right end of the rigid body, as shown in FIG. 3B. As shown in FIG. 3C, the rigid body 202 can include a slot 214 on a top side of the rigid body 202. A first fastener 216 can couple the first engagement member 204 to the rigid body 202. Generally, the first fastener 216 can be threaded through the slot 214 to couple the first engagement member 204 to the body 202. In one embodiment, the first fastener 216 can be a thumb screw. It is to be appreciated that other types of fasteners can be implemented to secure the first engagement member 204 to the rigid body 202.

The second engagement member 206 can generally be located approximate a left end of the rigid body 202. Generally, the second engagement member 206 can be fixedly attached to the rigid body 202. A second fastener 218 can be implemented to secure the second engagement member 206 to the rigid body 202. In one embodiment, the second fastener 218 can be a screw. It is to be appreciated that other fasteners can be implemented to fixedly secure the second engagement member 206 to the rigid body 202.

Generally, the stop member 212 can be secured inside the body 202 between the first engagement member 204 and the second engagement member 206. A fastener 220 can be implemented to secure the stop member 212 inside the body 202. In one embodiment, the stop member 212 can be located approximate the aperture 210, as shown in FIG. 3B. The stop member fastener 220 can include, but is not limited to, a screw, a nut, a magnet, and a patch of hook and loop material. It is to be appreciated that the stop member fastener 220 can include a variety of attachment structures adapted to couple two objects together.

As shown in FIG. 3B, the spring 208 can be located between the first engagement member 204 and the stop member 212. In one embodiment, the spring 208 can be a compression spring. For instance, the spring 208 can be loaded with compression between the first engagement member 204 and the stop member 212. The spring 208 can be adapted to provide a resistive force to the first engagement member 204 as the first engagement member 204 moves along the slot 214. For instance, as the first engagement member 204 moves toward the stop member 212, the spring 208 can have more compression. Some compression can be released as the first engagement member 204 moves away from the stop member 212.

Similar to the first embodiment engagement members, ends of the second embodiment engagement members 204, 206 can have a plurality of different shapes. For instance, ends of the engagement members 204, 206 can be adapted to interface with a tube, a rectangular tube, and/or a square tube of a hand truck frame.

The rigid body 202 can include the aperture 210 to receive a fastener 222. Generally, the fastener 222 can be implemented to removably couple a strapping device to the rigid body 202. The strapping device fastener 222 can include, but is not limited to, a screw, a nut, a magnet, and a patch of hook and loop material. It is to be appreciated that the strapping device fastener 222 can include a variety of attachment structures adapted to couple two objects together.

Example Embodiments of the Mounting Structures

The following examples of the first embodiment mounting structure 100 and the second embodiment mounting structure 200 are provided for illustrative purposes only and are not meant to be limiting.

An example first embodiment mounting structure 100 can include the body 102 being an aluminum tube having a substantially rectangular cross-section. The body 102 can be 10 inches long with a 2 inch by 1 inch cross-section. The body 102 can be 1/8 of an inch thick.

The first engagement member 104 and the second engagement member 106 can both be rigid plastic blocks having substantially rectangular cross-sections. The first engagement member 104 can be 3 and 3/16 inches long with a 1 and 11/16 inches by 5/8 inches cross-section. The first engagement member 104 can be 5/8 inches thick. The second engagement member 106 can be 5 and 3/8 inches long with a 1 and 11/16 inches by 5/8 inches cross-section. The second engagement member 106 can be 5/8 inches thick.

The spring 108 can be 2 and 1/2 inches long by 3/4 wide. The spring 108 can be made from stainless steel.

Typically, the slot 112 can be approximately 1 inch in length and set back about 3/4 of an inch from the right end of the body 102. The first fastener 114 can be a thumb screw that can move through the slot. As such, the first engagement member 104 can move back and forth approximately 1 inch. The second fastener 116 can be a screw located approximately an inch from the left end of the body 102 opposite the slot 112. The aperture 110 can be located approximately 2 and 3/4 inches from the left end of the body 102 or 7 and 1/4 inches from the right end of the body 102.

An example second embodiment mounting structure 200 can include the body 202 being an aluminum tube having a substantially rectangular cross-section. The body 202 can be 14 inches long with a 2 inch by 1 inch cross-section. The body 202 can be 1/8 of an inch thick.

The engagement members 204, 206 and the stop member can each be rigid plastic blocks having substantially rectangular cross-sections. Generally, the engagement members 204, 206 and the stop member 212 can be 3 and 3/16 inches long with a 1 and 11/16 inches by 5/8 inches cross-section. The engagement members 204, 206 and the stop member 212 can be 5/8 inches thick. Similar to the first example, the spring 208 can be manufactured from stainless steel and be 2 and 1/2 inches long by 3/4 of an inch wide.

The stop member fastener 220 can be a screw located approximately 5 and 1/4 inches from the right side of the body 202. Typically, the slot 214 can be approximately 1 inch in length and set back about 3/4 of an inch from the right end of the body 202. The first fastener 216 can be a thumb screw that can move freely through the slot. As such, the first engagement member 204 can move back and forth approximately 1 inch. The second fastener 218 can be a screw located approximately 1 inch from the left end of the body 202. The aperture 210 can be located approximately 7 inches from the left end and the right end of the body 202.

An Example Implementation of a Mounting Structure

Generally, the first embodiment mounting structure 100 and the second embodiment mounting structure 200 can be implemented in similar ways. Hereinafter, mounting structure will refer to both the first embodiment and second embodiment mounting structures.

A mounting structure can generally be implemented with a variety of types of hand trucks and load carriers. Depending on a specific load and type of hand truck, the mounting structure can be fitted in several different locations on a frame of the hand truck. For instance, depending on the hand truck frame, the mounting structure can be moved and secured between a lower portion of the hand truck and an upper portion of the hand truck. The mounting structure can be implemented to provide a strapping device to a location on the hand truck where the strapping device would be most useful. For instance, the mounting structure can be moved to an upper portion of the hand truck for loads that are taller than the hand truck.

In a first step, a user can secure a strapping device to the mounting structure. Generally, a screw can be implemented to couple the strapping device to the mounting structure.

In a second step, after the strapping device is secured to the mounting structure, the user can determine a location to secure the mounting structure to the hand truck.

In a third step, the user can attach the mounting structure to the hand truck. To attach the mounting structure, the first engagement member can be loosened. With the first engagement member loosened, the first engagement member can slide back and forth to fit inside the hand truck frame. For instance, the first engagement member can be moved back so that the rigid body can fit between the hand truck frame. Once the mounting structure is positioned correctly, the first engagement member can be released. After being released, the spring inside the rigid body can push the first engagement member forward to engage the hand truck frame. The user can then tighten the fastener to secure the first engagement member in a locked position.

In a fourth step, the strapping device can be used to secure a load to the hand truck.

To remove the mounting structure, the user can loosen the fastener securing the first engagement member to the rigid body. The user can then move the first engagement member back and remove the mounting structure from the hand truck. The mounting structure is then ready to be attached to another location on the hand truck or a different hand truck altogether.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A mounting structure for use with a hand truck, the mounting structure comprising:
    a body having a substantially rectangular cross-section, a first end, a second end, and an aperture;
    a first member slidably coupled to the body approximate the first end, the first member being a block having a substantially rectangular cross-section and being partially inserted into the body;
        wherein an end of the first member located outside the body has a concave face that engages a frame of the hand truck in a first location;
    a second member fixedly coupled to the body approximate the second end, the second member being a block having a substantially rectangular cross-section and being partially inserted into the body;
        wherein an end of the second member located outside the body has a concave face that engages the frame of the hand truck in the first location;
    a spring located between the first member and the second member inside the body, the spring providing a constant restorative force to the first member when the first member is engaged to the frame of the hand truck; and
    a strapping device coupled to the body proximate the aperture, the strapping device adapted to rotate in a plane parallel to a plane defined by the mounting structure;

wherein the first member and the second member are each adapted to be disengaged from the frame of the hand truck and engaged to the frame of the hand truck in a second location.

2. The mounting structure of claim 1, wherein a fastener rotatably couples the strapping device to the body.

3. The mounting structure of claim 1, wherein the body includes a slot (i) located approximate the first end of the body, and (ii) adapted to receive a fastener.

4. The mounting structure of claim 3, wherein a fastener couples the first member to the body proximate the slot.

5. The mounting structure of claim 1, wherein the body further includes a plurality of apertures each adapted to receive a fastener.

6. A combination comprising:
    a hand truck; and
    the mounting structure of claim 1 coupled to the hand truck.

7. A mounting structure for use with a hand truck, the mounting structure comprising:
    a body having an aperture;
    a first member slidably coupled to the body, the first member being a block having a substantially rectangular cross-section and being partially inserted into the body;
        wherein an end of the first member located outside the body has a concave face that engages a frame of the hand truck in a first location;
    a second member fixedly coupled to the body, the second member being a block having a substantially rectangular cross-section and being partially inserted into the body;
        wherein an end of the second member located outside the body has a concave face that engages the frame of the hand truck in the first location;
    a third member fixedly coupled inside the body; and
    a spring located inside the body between the first member and the third member, the spring providing a constant restorative force to the first member when the first member is engaged to the frame of the hand truck;
    a strapping device coupled to the body proximate the aperture, the strapping device adapted to rotate in a plane parallel to a plane defined by the mounting structure;
    wherein the first member and the second member are each adapted to be disengaged from the frame of the hand truck and engaged to the frame of the hand truck in a second location.

8. The mounting structure of claim 7, wherein a fastener rotatably couples the strapping device to the body proximate the aperture.

9. The mounting structure of claim 7, wherein the body includes a slot.

10. The mounting structure of claim 9, wherein the first member is coupled to the body proximate the slot.

11. The mounting structure of claim 7, wherein the body is a tube having a substantially rectangular cross-section.

12. The mounting structure of claim 7, wherein the body includes a plurality of apertures each adapted to receive a fastener.

13. A mounting structure system comprising:
    a hand truck having a frame;
    a strapping device; and
    a mounting structure adapted to removably couple to the hand truck, the mounting structure including:
        a body adapted to couple to the strapping device, wherein the strapping device is adapted to rotate from a horizontal orientation to a vertical orientation in a plane parallel to a plane defined by the mounting structure;
        a first member adapted to interface with the frame of the hand truck, the first member being slidably coupled to the body;
        a second member adapted to interface with the frame of the hand truck, the second member being fixedly coupled to the body; and
        a spring located between the first member and the second member inside the body.

14. The mounting structure system of claim 13, wherein the strapping device is adapted to be rotatably coupled to the body.

15. The mounting structure system of claim 13, wherein the strapping device includes a ratchet.

16. The mounting structure of claim 13, wherein the mounting structure removably couples to the frame of the hand truck in a first location and is adapted to be removed from the frame and coupled to a second location on the frame of the hand truck.

17. The mounting structure of claim 13, wherein (i) an end of the first member located outside the body has a concave face that engages a frame of the hand truck, and (ii) an end of the second member located outside the body has a concave face that engages a frame of the hand truck.

18. A method of implementing the mounting structure system of claim 13, the method comprising:
    providing the mounting structure system of claim 13;
    securing the strapping device to the body of the mounting structure in a horizontal orientation;
    selecting a first location on the hand truck frame to attach the mounting structure;
    attaching the mounting structure to the first location on the hand truck frame; and
    securing a load to the hand truck with the strapping device.

19. The method of claim 18, the method further comprising:
    removing the mounting structure from the hand truck frame;
    selecting a second location on the hand truck frame to attach the mounting structure;
    attaching the mounting structure to the second location on the hand truck frame;
    rotating the strapping device to a vertical orientation; and
    securing a second load to the hand truck with the strapping device in the vertical orientation.

20. The method of claim 18, wherein the step of attaching the mounting structure to the first location on the hand truck includes:
    sliding a substantial portion of the first member inside the body;
    holding the first member inside the body;
    placing the mounting structure between the frame of the hand truck at the first location;
    releasing the first member to engage the frame of the hand truck; and
    tightening a fastener securing the first member to the mounting structure.

* * * * *